(12) United States Patent
Takahashi

(10) Patent No.: US 8,509,480 B2
(45) Date of Patent: Aug. 13, 2013

(54) MOBILE DETECTOR, MOBILE DETECTING PROGRAM, AND MOBILE DETECTING METHOD

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 995 days.

(21) Appl. No.: 12/526,336

(22) PCT Filed: Mar. 17, 2008

(86) PCT No.: PCT/JP2008/054857
§ 371 (c)(1),
(2), (4) Date: Aug. 7, 2009

(87) PCT Pub. No.: WO2008/114769
PCT Pub. Date: Sep. 25, 2008

(65) Prior Publication Data
US 2010/0260377 A1    Oct. 14, 2010

(30) Foreign Application Priority Data

Mar. 22, 2007    (JP) .................................. 2007-074435

(51) Int. Cl.
*G06K 9/00*    (2006.01)
(52) U.S. Cl.
USPC .......................................... 382/103; 382/100
(58) Field of Classification Search
USPC ................................................ 382/100, 103
See application file for complete search history.

(56) References Cited

U.S. PATENT DOCUMENTS

| 5,910,817 | A  | * | 6/1999 | Ohashi et al. | ................. 348/159 |
| 7,106,885 | B2 | * | 9/2006 | Osterweil et al. | ............. 382/103 |
| 7,116,246 | B2 | * | 10/2006 | Winter et al. | ............... 340/932.2 |

FOREIGN PATENT DOCUMENTS

| JP | 9-033232   | A | 2/1997  |
| JP | 11-252587  | A | 9/1999  |
| JP | 2004078459 | A | 3/2004  |
| JP | 2004355082 | A | 12/2004 |
| JP | 3742759    | B |         11/2005 |

OTHER PUBLICATIONS

International Search Report for PCT/JP2008/054857 mailed May 1, 2008.

* cited by examiner

*Primary Examiner* — Shefali Goradia

(57) ABSTRACT

When a mobile is detected using an imaging device installed in the mobile, the image of a partial area is enlarged/reduced depending on variation in distance to the detection object mobile and then it is compared under a fixed scale thus causing increase in computation cost. In order to eliminate the need for an enlargement/reduction processing or a deformation correction processing every time when collation is performed, an input image is converted into a virtual plane image having a size or a shape on the image of a detection object mobile which does not vary depending on the distance between the mobiles. Using a pair of virtual plane images obtained at two different times, points are made to correspond and the mobile is detected based on the gap of corresponding points.

15 Claims, 17 Drawing Sheets

FIG. 8

| SHIFT AMOUNT zw | 1 | 2 | 3 | 4 | 5 | 6 | 7 | 8 |
|---|---|---|---|---|---|---|---|---|
| 3 PIXELS TO LEFT | 0 | 0 | 0 | 0 | 0 | 0 | 0 | 0 |
| 2 PIXELS TO LEFT | 0 | 2 | 3 | 0 | 4 | 2 | 0 | 0 |
| 1 PIXEL TO LEFT | 1 | 2 | 0 | 0 | 0 | 0 | 0 | 0 |
| SHIFT AMOUNT 0 | 0 | 0 | 0 | 0 | 0 | 0 | 0 | 0 |
| 1 PIXEL TO RIGHT | 0 | 0 | 0 | 0 | 0 | 0 | 0 | 0 |
| 2 PIXEL TO RIGHT | 1 | 0 | 0 | 0 | 0 | 0 | 0 | 0 |

FIG. 9

| SHIFT AMOUNT zw | 1 | 2 | 3 | 4 | 5 | 6 | 7 | 8 |
|---|---|---|---|---|---|---|---|---|
| 3 PIXELS TO LEFT | 0 | 0 | 0 | 0 | 0 | 0 | 0 | 0 |
| 2 PIXELS TO LEFT | 5 | 5 | 9 | 11 | 9 | 6 | 6 | 2 |
| 1 PIXEL TO LEFT | 3 | 3 | 3 | 2 | 0 | 0 | 0 | 0 |
| SHIFT AMOUNT 0 | 0 | 0 | 0 | 0 | 0 | 0 | 0 | 0 |
| 1 PIXEL TO RIGHT | 0 | 0 | 0 | 0 | 0 | 0 | 0 | 0 |
| 2 PIXEL TO RIGHT | 1 | 1 | 1 | 0 | 0 | 0 | 0 | 0 |

MOBILE DETECTOR, MOBILE DETECTING PROGRAM, AND MOBILE DETECTING METHOD

The present application is the National Phase of PCT/JP2008/054857, filed Mar. 17, 2008, which claims priority based on Japanese Patent Application No. 2007-074435 filed on Mar. 22, 2007, the entire disclosure of which is incorporated herein.

TECHNICAL FIELD

The present invention relates to a mobile detector which detects, by using a single imaging device installed on a mobile, another mobile traveling in parallel with the mobile, and particularly, to a mobile detector which is suited to detect another mobile traveling faster than the mobile on which the imaging device is installed.

BACKGROUND ART

Here, a mobile which installs a camera functioning as an imaging device is called a mobile A, and a mobile which is a subject to be detected is called a mobile B. As a method which can detect the mobile B by analyzing an image picked up by the camera installed on the mobile A, there has been known a method based on an optical flow, disclosed in Patent Document 1. Also, the mobile B can be detected by using an image processor disclosed in Patent Document 2 with which an object at rest also can be detected. With the invention disclosed in Patent Document 2, a candidate area is set for judging whether a target object is pictured in an image picked up, a virtual plane and a motion parameter of the target object are variously assumed in a real space, an image in the candidate area at a prescribed time after is estimated and created to be compared with an image actually observed, and a presence of the target object in the candidate area is judged based on a facing direction of a virtual plane which gives an estimated image that is most similar to the image actually observed.

Patent Document 1: Japanese Unexamined Patent Publication 2004-355082 (FIG. 1)
Patent Document 2: Japanese Patent Number 3742759 (FIG. 1)

DISCLOSURE OF THE INVENTION

Problems to be Solved by the Invention

However, the techniques described above have a problem in terms of a calculation amount. With the invention disclosed in Patent Document 1, it is required to compare partial area images in the input image with each other at various places, and its calculation cost becomes high. In particular, when a distance between the mobile A and the mobile B varies, one of partial area images is required to be enlarged/reduced every time when each of the partial area images are to be related considering that a size of the mobile B at a time 202 is changed from the size at a time 201 in the image, and consequently, the calculation cost is increased further. Furthermore, when imaging the object by using a wide-angle lens or the like, a deformation of the image due to the distortion of the lens is required to be corrected.

Also, with the image processor disclosed in Patent Document 2, it is required to perform image processing such as enlargement/reduction, parallel displacement, and distortion correction for comparing the images each other by variously assuming parameters indicating relative motions of the mobile A and the mobile B, and therefore the calculation cost for performing collation becomes high. Further, if a candidate area in which only the mobile B is included is not set, an excellent collation cannot be performed. Therefore, it is required to set various candidate areas.

As such, as a problem common to the techniques described above, when a distance to the mobile B which is a detection target varies, enlargement/reduction processing and distortion correction processing have to be performed every time the partial area images are compared, and the calculation cost has been increased.

The present invention is intended to solve the above described problems, and the object of the invention is to provide a mobile detector which can detect the mobile B which is a detection target with lesser calculation amount when the mobile A on which the imaging device is installed and the detection target mobile B which is a detection target are traveling in the same direction.

Means for Solving the Problems

In order to solve the foregoing problems, the present invention is configured to: based on an assumption that each pixel of an input image obtained by an imaging device installed on a mobile corresponds to each point on a virtual plane parallel to a traveling direction of the mobile, in a real world; convert the input image to an image viewed from a direction perpendicular to the virtual plane for generating a virtual plane image; relate the points on two virtual plane images which are generated at two different times; obtain shift amounts between the corresponding points; and detect a detection target mobile based on an arrangement of the points whose shift amounts are equal.

When two mobiles are traveling in parallel, the size and shape of the detection target mobile do not change on the virtual plane image. Therefore, the enlargement/reduction processing is not required to be performed every time the partial images are collated on searching the corresponding points, and the processing can be speeded up.

Effects of the Invention

The present invention converts the input image of the imaging device in such a manner that the size of the detection target mobile is not changed on the virtual plane image even when the distance between the mobile on which the imaging device is installed and another mobile which is a detection target, and extracts the shift amount by using the converted image. Therefore, the enlargement/reduction processing which has been considered to be essential is not required at collating the partial area images, and the calculation amount and time for detecting the mobile can be reduced.

BEST MODE FOR CARRYING OUT THE INVENTION

Next, exemplary embodiments of the invention will be described by referring to the accompanying drawings.

FIG. 1 is a functional block diagram showing a configuration of a mobile detector 1 according to an exemplary embodiment to which the invention is applied, in a simplified manner, and FIG. 2 is a block diagram showing a connection state of a computer 2 configuring a main part of the mobile detector 1 and a camera 3 functioning as an imaging device.

The mobile detector 1 includes: a virtual plane image generating device 101 which generates a virtual plane image by mapping each pixel within an image obtained by the camera onto a virtual plane on a real world parallel to a traveling direction of a mobile, such as a vehicle, installing the camera 3; and a mobile detecting device 102 which relates each of points on two virtual plane images which are generated at two different times, obtains a shift amount between corresponding points, and detects the detection target mobile based on an arrangement of the points whose shift amounts are equal.

Specifically, the virtual plane image generating device 101 and the mobile detecting device 102 shown in FIG. 1 are configured with a computer 2 as shown in FIG. 2. The computer 2 includes: a CPU 4 for calculation processing; a ROM 5 which stores a program for controlling the CPU 4; a RAM 6 used for storing a calculation data temporarily, and the like; a non-volatile memory 7 which stores various types of parameters and the like; frame memories 8 and 9 which are the same in function; and a timer 10 for measuring a lapse of time. To an input/output circuit 11 of the CPU 4, the camera 3 which functions as the imaging device, a display 12 such as an LCD, and a manual data input device 13 such as a keyboard, are connected.

The frame memories 8 and 9 may be configured by using a part of a storing region of the RAM 6, and the timer 10 may be configured by a counter or the like which counts a machine clock of the CPU 4. The ROM 5 stores a control program, i.e., a mobile detecting program, for causing the CPU 4 to function as the virtual plane image generating device 101 (virtual plane image generating function realizing device), the mobile detecting device 102 (mobile detecting function realizing device), and further, an area setting function realizing device.

On an assumption that each pixel of the input image obtained by the camera 3 installed on the mobile such as a vehicle or the like corresponds to each point on the virtual plane on the real world parallel to the traveling direction of the mobile, the virtual plane image generating device 101 generates a virtual plane image by converting the input image to an image viewed from a direction perpendicular to the virtual plane.

A method of setting the virtual plane and a method of generating the virtual plane image are described in detail by referring to the drawings.

FIG. 3 is a conceptual diagram showing an example of an image captured when the camera 3, installed at a backward-looking posture on the vehicle as the mobile, is traveling on a center-lane of a three-lane roadway.

A vehicle 301 traveling on a neighboring lane is a detection target mobile. As a virtual plane, there is set a virtual plane 401 which is perpendicular to a road surface on the real world and includes a traveling path of the driving vehicle 301, as shown in FIG. 4. A traveling path 402 is a movement locus along which a point included in the vehicle 301 of the real world moves.

Next, a specific method of generating the virtual plane image will be described hereinafter. A projective transformation model is assumed as an optical system to be used here. A correspondence relation between a real world coordinate system (xw, yw, zw) and a camera 3 coordinate system (x, y, z) is defined by Expression 1.

$$\begin{bmatrix} x \\ y \\ z \end{bmatrix} = R \begin{bmatrix} x_w \\ y_w \\ z_w \end{bmatrix} + T \qquad \text{[Expression 1]}$$

Here, R represents a rotation matrix of 3×3 as shown in Expression 2.

$$R = \begin{bmatrix} r_{11} & r_{12} & r_{13} \\ r_{21} & r_{22} & r_{23} \\ r_{31} & r_{32} & r_{33} \end{bmatrix} \qquad \text{[Expression 2]}$$

Also, T represents a transfer vector of 3×1 as shown in Expression 3.

$$T = \begin{bmatrix} T_x \\ T_y \\ T_z \end{bmatrix} \qquad \text{[Expression 3]}$$

Here, the coordinate system may be set at will. In this case, for simplification, the real world coordinate system (xw, yw, zw) is set in such a manner that: a direction perpendicular to the road surface is yw-axis; a traveling direction of the mobile is zw-axis; and a direction orthogonal to both of yw-axis and zw-axis is xw-axis. Also, the camera 3 coordinate system is set in such a manner that: a horizontal direction on an imaging face of a CCD imaging sensor or the like, that is, a direction along with a traveling direction of the detection object vehicle 301 within the image is x-axis; a vertical direction is y-axis; and an optical axis direction is z-axis. Further, assuming that a horizontal direction of the input image is Xu-axis and a vertical direction of the input image is Yu-axis, a relation between an image coordinate system (Xu, Yu) and the camera 3 coordinate system is defined by Expression 4, with a focal distance of the lens being f.

$$X_u = f \frac{x}{z}, \qquad \text{[Expression 4]}$$
$$Y_u = f \frac{y}{z}$$

The virtual plane 401 can be expressed by using Expressions with xw'=xw₀ (xw₀ is a constant). Therefore, to assume that each pixel in the input image corresponds to each point on the plane 401 in the real world means to fix the xw as "xw=xw₀." At this, time, a point (Xu, Yu) on the image coordinate system corresponding to a point (xw₀, yw, zw) on the real world coordinate system is expressed by Expression 5, to be uniquely determined.

$$X_u = f \frac{x}{z} = f \frac{r_{11}x_{w0} + r_{12}y_w + r_{13}z_w + T_x}{r_{31}x_{w0} + r_{32}y_w + r_{33}z_w + T_z} \qquad \text{[Expression 5]}$$
$$Y_u = f \frac{y}{z} = f \frac{r_{21}x_{w0} + r_{22}y_w + r_{23}z_w + T_y}{r_{31}x_{w0} + r_{32}y_w + r_{33}z_w + T_z}$$

Therefore, based on this relationship, the pixel in the input image is mapped onto the virtual plane whose two axes are yw-axis and zw-axis, and the virtual plane image is generated. A virtual plane image in correspondence with an input image shown in FIG. 3 is shown in FIG. 5. The virtual plane image generating device 101 generates the virtual plane image every time when a new input image is inputted from the camera 3.

Meanwhile, the mobile detecting device 102 obtains corresponding points of the two virtual plane images generated at two different times by the virtual plane image generating device 101 and extracts shift amounts between the corresponding points, and judges the presence of the mobile based on the arrangement of the points having the same shift amount.

First, a way to obtain the corresponding points and a method to extract the shift amount will be described in detail by referring to the accompanying drawings. The corresponding points may be obtained by searching for all the pixels in the image, or may be extracted from within some distinguishing pixels which are easy to be related. FIG. 6 shows a result of extracting angular points as feature points from two virtual plane images obtained at two different times. The angular points can be extracted easily by using well-known methods such as Harris corner detection.

Next, the feature points extracted from the two virtual plane images are related. The search of the corresponding points is performed by, firstly focusing on a local area pattern centered around each feature point extracted from one virtual plane image 601, and then extracting a local area which matches best to the above described local area pattern from another virtual plane image 602. At this time, respective pixels included in the local area patterns are related. A value obtained by calculating such as sum of squires of the difference between a pair of corresponding pixels is defined as a distance between the local area patterns, and the points where the distance therebetween becomes minimum and equal to or less than a threshold value are determined as corresponding points. If the minimum value of the distance is not equal to or less than the threshold value, it is determined that the corresponding points cannot be detected, and the feature point extracted from the virtual plane image 601 are discarded. When the feature points have been related with each other, a displacement amount (direction is also considered) between the pixels, or the feature points, is obtained, and defined as a shift amount. Here, as a merit of using the virtual plane image, search of the corresponding local area pattern can be performed by limiting the search range to the local areas on the same yw-axis, and the shift amount can be obtained by focusing only a distance in a horizontal direction between the pixels. It is because that the detection object vehicle 301 moves only in a left and right directions on the virtual plane image under condition of the positional relationship of the vehicle to which the camera 3 is installed, the detection object vehicle 301, and the virtual plane. Also, if a relative velocity between the two vehicles is limited within a certain range, a search range of the feature points in the virtual plane image in a horizontal direction can be limited. For example, assuming that a relative velocity between the two vehicles is limited in a range from −S (m/frame) to +S (m/frame), and the distance from a pixel to a neighboring pixel in the horizontal direction of the virtual plane image on the virtual plane is T (m), the search range of a point corresponding to a feature point (a, b) at a time t−1 can be limited within a range from (a−s/T, b) to (a+s/T, b).

Next, a method of judging the presence of the vehicle 301 based on the arrangement of the shift amounts of the feature points will be described in detail by referring to the drawings. For example, suppose that two virtual plane images 601 and 602 as shown in FIG. 6 are obtained at two different times, and, as the result of relating of the feature points, the shift amounts of the feature points as shown in FIG. 7 are detected. Here, it is assumed that the length of an arrow shown in FIG. 7 indicates a quantity of the shift amount, and the direction pointed by the arrow indicates the traveling direction. When an entire length of the detection object vehicle 301 is L (m) at least in the real world, the vehicle has to occupy an area ranging for L/T (pixels) or more in lateral width on the virtual plane image. Accordingly, there is a high possibility that a plurality of feature points having the same shift amount are detected within a range of L/T (pixels) in lateral width. Thus, by aggregating pieces of information of the shift amount in the vertical direction, a table as shown in FIG. 8 is formed, which corresponds to a histogram of the shift amounts, in which a horizontal axis shows a coordinate of a position of the feature point on the zw-axis and a vertical axis shows the shift amount of the pixel. Then, partial sections ranging a width of L/T are taken variously, and histogram values of the same shift amount in the partial sections are accumulated. When the maximum of the accumulated histogram values exceeds a predetermined threshold value, it is determined that the vehicle 301 is present in the partial sections. FIG. 9 is a table showing an accumulated histogram values based on the histogram values shown in FIG. 8, assuming that L/T=5, in which the accumulated value is stored at a center spot of the partial sections. In FIG. 9, at a spot where the coordinate value on ZW-axis is 4 and the shift amount in the left direction is 2, the accumulated value is 2+3+0+4+2=11 (see FIG. 8), which is the maximum value. The presence of the vehicle 301 is determined by comparing the maximum value and the threshold value. When the maximum value is equal to or more than the threshold value, it is determined that the overtaking vehicle 301 having a velocity corresponding to "the shift amount (the number of pixels)×T (interval between the pixels)," i.e., 2*T (m/frame), is present at a position centering around the position with zw'=4.

Described above is a case in which the virtual plane image is generated as a two dimensional image. However, if the calculation amount or the memory usage is desired to be reduced, it may be generated as a virtual line having one pixel width and extending in a horizontal direction so as to include the vehicle 301, i.e., may be generated as a segment area, instead of the virtual plane. In this case, a step of aggregating pieces of information in a vertical direction is not required and the processing can be speeded up further.

Also, described above is a case in which only the histogram values corresponding to the same shift amount are accumulated when accumulating the histogram values of the feature points, but the histogram values may be accumulated in such a manner as including the histogram values of the feature points not corresponding to the same shift amount as long as the difference between the shift amounts is equal to or less than a certain value (for example, equal to or less than ±1 pixel), considering a detection error of the shift amount.

Also, described above is a case in which the entire length of the vehicle 301 is L(m) only. However, when there are several types of detection object vehicles whose lengths are greatly different from each other, the presence of the vehicles may be determined with each case by assuming a plurality of entire lengths and accumulating the histogram values in respective partial sections corresponding to the various entire lengths. With this, the vehicles whose lengths are different from each other, such as a large truck and a motorcycle, can be extracted together.

FIG. 10 is a flowchart showing a flow of processing with a mobile detecting program stored in a ROM 5 in a simplified manner.

Next, processing operations of the CPU 4 of the computer 2, functioning as the virtual plane image generating device 101, the mobile detecting device 102, and an area setting function realizing device, and a mobile detecting method according to the exemplary embodiment will be described specifically by referring to FIG. 10.

When the mobile detecting program is started in response to a start instruction issued from a manual data input device 13, an initializing processing of the data in the RAM 6 and the frame memories 8 and 9 is executed by the CPU 4 (step a1).

Then, the CPU 4, functioning as the area setting function realizing device, receives an input of the entire length L corresponding to the detection object vehicle 301 from the user via the manual data input device 13, and the non-volatile memory 7 stores the entire length L as a parameter (step a2).

Next, the CPU 4 transfers the data related to the positions of the feature points for one frame, stored in the frame memory 9, to the frame memory 8 collectively (step a3), then outputs an image taking instruction to the camera 3 via the input/output circuit 11, stores the image obtained by operating the camera 3 into the RAM 6 temporarily (step a4), and starts a measurement of a lapsed time after taking the image by restarting the timer 10 which controls a taking cycle of the image (step a5).

Next, the CPU 4, functioning as the virtual plane image generating device 101, generates the virtual plane image based on the input image obtained by the camera 3, i.e., the image currently being stored in the RAM 6 temporarily (step a6, see FIG. 5), extracts all the feature points (zw, yw) from the virtual plane image, and updates the frame memory 9 by storing the content of the feature points (step a7, see 602 in FIG. 6).

The specific method of generating the virtual plane image and extracting the feature points are as described already.

Next, the CPU 4, functioning as the mobile detecting device 102, compares the feature points being stored in the frame memory 9 currently, i.e., the feature points extracted from the image picked up at a processing of a current cycle (see 602 in FIG. 6), and the feature points being stored in the frame memory 8 currently, i.e., the feature points extracted from the image picked up at a processing one cycle before (see 601 in FIG. 6), and obtains all pairs of the feature points (zw, yw), (zw', yw') (step a8), and further, obtains displacements between the corresponding feature points, i.e., a shift amount Δs in one processing cycle, with respect to all pairs of the feature points (step a9, see FIG. 7).

The specific method of specifying the feature points to be paired is as described already.

As described above, since the displacements between the feature points can be obtained by focusing only a distance in a horizontal direction between the pixels, the substantial shift amount Δs can be obtained by calculating "zw−zw'." Note that the value of the shift amount Δs is not an absolute value, but a value containing plus or minus sign corresponding to the pointing direction of the arrow in FIG. 7, i.e., the traveling direction of the detection object vehicle 301.

Next, the CPU 4, functioning as the mobile detecting device 102, acquires the number of feature points (zw, yw) which are the same in value of zw and value of the shift amount Δs and different only in value of yw, integrates the number for each shift amount Δs, stores those integrated values in a table which corresponds to a histogram of the shift amounts, whose horizontal axis shows zw and vertical axis shows the shift amount Δs of the pixel, in such a manner that value of zw in (zw, yw) corresponds to the horizontal axis showing zw and value of Δs in (zw, yw) corresponds to the vertical axis showing Δs, respectively, and the table which corresponds to a histogram of the shift amounts is formed (step a10, see FIG. 8).

Next, the CPU 4, functioning as the region setting function realizing device, obtains the length of L/T (pixels) of the partial area occupied by the detection object vehicle 301 in the horizontal direction on the virtual plane image, based on the value of the entire length L stored in the non-volatile memory 7 as a parameter and the distance T on the virtual plane corresponding to the distance between the pixels. Further, the CPU 4, functioning as the mobile detecting device 102, accumulates the integrated values described within a continuous sections ranging for L/T, for each row showing Δs, in the table of the histogram values shown in FIG. 8, stores the accumulated value by relating to an absolute position of Zw which corresponds to a center spot of the partial sections, and newly generates a table in which the accumulated histogram values are stored (step a11, see FIG. 9).

Then, the CPU 4, functioning as the mobile detecting device 102, reads the accumulated values stored in the (Zw, Δs) spot in the table as shown in FIG. 9 in order (step a12), determines whether the accumulated values reach the threshold value (setting value) stored in the non-volatile memory 7 in advance as the parameter (step a13), and only when the accumulated values reach the threshold value, recognizes the presence of the detection object vehicle 301.

More specifically, based on the value of (Zw, Δs) corresponding to the spot of the accumulated value currently read out from the table shown in FIG. 9, the CPU 4 outputs text data which indicates that the vehicle 301 having the entire length of L or more is present at the position of Zw and its traveling velocity is Δs·T (m/frame) to the display device 12 via the input/output circuit 11, and the outputted content is notified to a driver in the vehicle on which the camera 3 and computer 2 are installed (step a14). Here, a voice output may be used instead of a visual display. Also, since the taking cycle of the image is a known value, it is easy to display the velocity by converting a unit of m/frame to mile-per-hour or the like.

Specifically, "the existing range and the traveling velocity can be extracted at the same time," as described in a section of MEANS FOR SOLVING THE PROBLEMS, means that, based on the value of (Zw, Δs) corresponding to the spot of the accumulated value, it can be recognized instantly at processing in step a14 that the vehicle 301 having the entire length (existence range) of L or more is present at the position of Zw and its traveling velocity is A s·T (m/frame).

After that, the CPU 4 determines whether the reading out processing and comparison processing of the data with respect to the accumulated values of all (Zw, Δs) spots in the table as shown in FIG. 9 are completed (step a15). When there is a spot where the reading out and comparison processing of the data are not completed, the CPU 4, functioning as the mobile detecting device 102, reads other accumulated values stored in the (Zw, Δs) spot in the table as shown in FIG. 9 in order, executes the processing from step a12 to step a15 repeatedly as described above. When the comparison processing with respect to the accumulated values of all (Zw, Δs) spots is completed finally, the loop processing is completed.

Next, the CPU 4 determines whether the lapsed time measured by the timer 10 reaches to the image taking cycle stored in the non-volatile memory 7 as the parameter, and if not reach, stands by as it is (step a16).

When the lapsed time reaches to the image taking cycle, the CPU 4 further determines whether an operation completing instruction is inputted by a user's operation from the manual data input device 13 (step a17).

When the input of the operation completing instruction is not detected, it means that the processing for detecting the vehicle 301 has to be continued. Therefore, the CPU 4 proceeds to the processing of step a3 again, transfers positional data of the feature points for one frame currently stored in the frame memory 9 to the frame memory 8 collectively, stores the data into the frame memory 8 by updating, obtains the image by the camera 3, generates the virtual plane image based on the obtained image, and stores the virtual plane image into the frame memory 9 by updating (step a3 to step a7). Then, processing after step a8 is performed repeatedly as described above, by targeting the data of the feature points in the updated frame memories 8 and 9.

As the result, the image is taken by the camera 3 every prescribed cycle determined by the image taking cycle being set as a parameter, the virtual plane image is newly generated at each time, and then the processing such as: relating the feature points on the virtual plane image generated at the image taking cycle immediately before (i.e., the data in the frame memory 8, see 601 in FIG. 6) to the feature points on the virtual plane image generated at the current image taking cycle (i.e., the data in the frame memory 9, see 602 in FIG. 6); calculating the shift amounts; and detecting the vehicle 301 based on the result of the calculation, are executed continuously and repeatedly.

Here, above described embodiment shows a case of a device executing a vehicle detecting processing with respect to a left side lane only viewed from the camera 3. However, the vehicle detection can be also executed with respect to a right side lane with a similar configuration. Further, the vehicle detection may be executed with respect to both left and right side lanes by processing for left side and right side independently. Furthermore, the virtual plane is described as a plane which is perpendicular to a road surface on the real world and includes a traveling path of the driving vehicle 301; however, as long as the virtual plane is parallel to the traveling direction of the vehicle 301, it is possible to obtain an image on which the size and shape of the detection object vehicle 301 are kept constant on the virtual plane image regardless of the distance between the vehicle on which the camera 3 is installed and the detection object vehicle 301. When the input image observed is distorted due to the lens distortion, the points on the virtual plane image and the pixels on the input image can be related in the same manner as described above by adding a relational expression which relates the camera-without-distortion coordinate system to a camera-with-distortion coordinate system, based on Tsai's method or the like. With this, the distortion due to the lens is eliminated from the virtual plane image, and the detection object vehicle 301 can be observed with the shape being constant regardless of the distance to the detection object vehicle 301. Further, although a search range for the corresponding points is limited on the same Yw coordinate in the embodiment described above, the search may be performed including pixels neighboring in a vertical direction considering some vertical movement of the vehicle 301. Furthermore, in the search processing of the corresponding points, the corresponding points may be obtained by collating only the local area patterns centering around the feature points extracted from the two virtual plane images 601 and 602, or, by searching a pattern, which is similar to a local area pattern centering around a feature point extracted from one of the virtual plane images, from the positions centering various pixels on the same yw coordinate of another virtual plane image. With the former method, it is advantageous that the processing takes a shorter time since the number of collations is smaller, and with the latter method, it is advantageous that the corresponding points can be obtained even when the feature points cannot be extracted from one of the virtual plane images.

Meanwhile, when a repeating pattern such as a guardrail is present as shown in FIG. 11, a plurality of similar partial areas 1501 and 1502 are included in the search range, and there is a possibility of establishing correspondences incorrectly when a point which gives the minimum value of the distance is selected uniquely. To deal with such a case, when a plurality of partial area patterns from which the distance to the local area pattern in one of the virtual plane images becomes equal to or less than a certain value are detected from another virtual plane image, the traveling vehicle 301 may be detected from corresponding relations in other feature points, by discarding the points obtained originally. With this, the detection object vehicle 301 can be detected correctly even when the repeating pattern such as the guardrail is present.

Next, another exemplary embodiment in which a mobile passing area extracting device which detects an area in a virtual plane image, corresponding to an area in a plane where the detection object vehicle 301 passes, as a mobile passing area, is provided in addition to the virtual plane image generating device and the mobile detecting device described above will be explained.

FIG. 12 is a functional block diagram showing a configuration of a mobile detector 14 according to another exemplary embodiment to which the present invention is applied. Hardware configurations of the computer 2 forming the main part of the mobile detector 14 and the camera 3 functioning as the imaging device are similar to those shown in FIG. 2, so the block diagram shown in FIG. 2 is used for explaining the substantial configuration.

The mobile detector 14 includes: the virtual plane image generating device 101 which generates the virtual plane image by mapping the pixels in the image obtained by the camera 3 on the virtual plane on the real world parallel to the traveling direction of the mobile such as the vehicle on which the camera 3 is installed; a mobile passing area extracting device 103 which detects an area in a virtual plane image, corresponding to an area in a plane where the detection object vehicle 301 passes, as a mobile passing area; and a mobile detecting device 102' which determines that the detection object mobile is present when the number of points whose shift amounts are the same in a partial area on the virtual plane image is equal to or more than a predetermined threshold value and one or more point whose shift amounts are the same is detected from the mobile passing area as shown in FIG. 12.

Specifically, the virtual plane image generating device 101, the mobile passing area extracting device 103, and the mobile detecting device 102' shown in FIG. 12 are configured with the computer 2 as shown in FIG. 2. The computer 2 includes: the CPU 4 for calculation processing; the ROM 5 which stores a program for controlling the CPU 4; the RAM 6 used for temporarily storing calculation data; the non-volatile memory 7 for storing respective types of the parameters and the like; the frame memories 8 and 9 which are the same in function; and the timer 10 for measuring a lapse of time. The camera 3 which functions as the imaging device, a display device 12 such as an LCD, and a manual data input device 13 such as a keyboard, are connected to an input/output circuit 11 of the CPU 4.

The ROM 5 stores a control program, i.e., a mobile detecting program, for causing the CPU 4 to function as: the virtual plane image generating device 101 (virtual plane image generating function realizing device); the mobile passing area extracting device 103 (mobile passing area extracting function realizing device); the mobile detecting device 102' (mobile detecting function realizing device); and further, a region setting function realizing device.

Among those, the configuration and function of the virtual plane image generating device 101 are completely the same as those of the exemplary embodiment shown in FIG. 1.

Also, the mobile passing area extracting device 103 has a function of specifying and outputting an existence range of the neighboring lane from the virtual plane image. The neighboring lane can be determined by detecting white lines at both sides of the neighboring lane and specifying a section sandwiched by the white lines as the neighboring lane. As a detecting method of the white lines, a method disclosed in a document ("Road white line recognition by the recognition method of model base," The Japan Society of Information and Communication Research, Shingaku Gihou PRMU99-211) can be used.

The mobile detecting device 102' according to the exemplary embodiment judges the presence of the detection object vehicle 301 not only based on the accumulated histogram values of the feature points in the partial sections as described above but also based on the facts that the accumulated histogram values reaches the threshold value and one or more feature points among the feature points which give the maximum accumulated histogram values are detected within the neighboring lane.

FIG. 13 is a flowchart showing a flow of processing according to the mobile detecting program stored in the ROM 5 in a simplified manner.

Next, the processing operation of the CPU 4 of the computer 2 functioning as the virtual plane image generating device 101, the mobile passing area extracting device 103, the mobile detecting device 102' and an area setting function realizing device, and a mobile detecting method according to the exemplary embodiment will be explained by referring to FIG. 13.

As described above, the configuration and function of the virtual plane image generating device 101 are completely the same as those of the exemplary embodiment shown in FIG. 1, and the processing from step b1 to step b6 shown in FIG. 13 corresponds to the processing from step a1 to step a6 shown in FIG. 10.

In this exemplary embodiment, at a stage when the generation processing of the virtual plane image by the virtual plane image generating device 101 is completed in step b6, the CPU 4 functioning as the mobile passing area extracting device 103 specifies an existence range of the neighboring lane from the virtual plane image and outputs the positional information thereof to the RAM 6 to be stored temporarily (step b7).

The processing from step b8 to step b13 shown in FIG. 13 corresponds to the processing from step a7 to step a12 shown in FIG. 10. With the processing, the CPU 4 functioning as the mobile detecting device 102' generates a table of the accumulated histogram values as shown in FIG. 9, reads out the accumulated values stored in respective spots of the table in order, and judges whether the accumulated values reach to the threshold value (setting value) stored in the non-volatile memory 7 as a parameter, as is in the case of the exemplary embodiment described above (step b14).

Note that, in this exemplary embodiment, the presence of the detection object vehicle 301 is not immediately confirmed even when the accumulated value is reached to the threshold value. The presence of the detection object vehicle 301 is recognized after that, only when the CPU 4 functioning as the mobile detecting device 102' judges whether at least one of some pieces of the data (zw, yw) of the feature points used for calculating the accumulated value in the spot is detected from the existence area of the neighboring lane, that is, the mobile passing area, obtained in the processing at step b7 (step b15), and the judging result is turned out as "true" (step b16).

For example, in the case of the table of the accumulated histogram values of the above described exemplary embodiment shown in FIG. 9, when an accumulated value at a spot where the coordinate value on ZW-axis is 4 and the shift amount in the left direction is 2 is calculated as 2+3++4+2=11 (see FIG. 8) to be a value exceeding the threshold value, the presence of the detection object vehicle 301 is recognized when at least one of those 11 pieces of the data (zw, yw) of the feature points is detected from the mobile passing area.

Here, since the data about Xw-axis direction has already been erased from the data of the feature points in the virtual plane image, the existence range of the neighboring lane is specified, based on the positional information about Yw axis direction, as an area sandwiched by two white lines at upper side and lower side as shown in FIG. 14 for example, in the processing at step b7.

The processing from step b17 to step b19 shown in FIG. 13 is equivalent to the processing from step a15 to step a17 shown in FIG. 10.

The effect will be described in detail by referring to the drawings. FIG. 14 shows an example of the virtual plane image, the feature points, and the shift amounts thereof when the traveling vehicle is present not on the neighboring lane but on a lane which is two lanes away. In this case, since points moving leftward on the virtual plane image are extracted by the vehicle detection device 1 shown in FIG. 1, the vehicle traveling on the lane which is two lanes away is also detected as the traveling vehicles. However, there may be a case in which only a vehicle on the neighboring lane is wanted to be detected. In such a case, respective positions of the traveling vehicles are distinguished according to neighboring lane positional information outputted from the mobile passing area extracting device 103. Specifically, the traveling vehicle 301 is judged to be present on the neighboring lane only when at least one or more of the feature points which are considered to be corresponding to the traveling vehicle are extracted from the mobile passing area as shown in FIG. 15.

As is clear from FIG. 14, tires of the vehicle traveling on the lane which is two or more lanes away occupy the positions farther than the white line which sections the lane on which the vehicle installing the camera 3 is traveling and the neighboring lane thereof, that is, occupy the positions on the upper side in FIG. 14, and, in the nature of the case, a chassis, a body, and the like of the vehicle occupy the positions upper than the tires. Consequently, determining whether the vehicle is traveling on the neighboring lane or the lane which is two or more lanes away can be surely realized by simply determining whether at least one piece of the data of the feature points is detected from the mobile passing area.

According to the exemplary embodiment, not only a vehicle which is approaching to own vehicle but also a vehicle which is relatively slower than the own vehicle can be detected. The feature points corresponding to the vehicle which is relatively slower than the own vehicle and the feature points corresponding to an object such as an electric pole 302 existing in the background are both characterized to move in such a direction as being away from the own vehicle, that is, in the rightward direction on the virtual plane image in the example shown in FIG. 7, and it is difficult to distinguish the two based on only the shift amount information of the points. However, if some of the feature points which give the maximum histogram value are extracted from the mobile passing area, it can be recognized that something is present on the neighboring lane, then it is possible to determine whether it is the movement of the object on the background or not. Also, even in a case when the feature points are extracted from road marking paint 1401 on the neighboring lane as shown in FIG. 16, those feature points are hardly accumulated since the feature points corresponding to objects which are different in horizontal distance from the camera 3 in the real world are different in moving speed on the virtual plane image, and possible to be distinguished from the vehicle.

Further, the present invention may be configured such as: on an assumption that the pixels of the input image obtained by the imaging device on the mobile correspond to the points on the virtual plane on the real world parallel to the traveling direction of the mobile, generating the virtual plane image by converting the input image to an image viewed from the perpendicular direction to the virtual plane; relating the points on two virtual plane images generated at two different times; obtaining the shift amount between the corresponding points; and detecting the detection object mobile based on the arrangement on the points having the same shift amount.

When two mobiles are traveling in parallel, the size and shape of the detection object mobile on the virtual plane image do not change. Therefore, the enlargement/reduction processing is not required every time the partial images are to be collated to search the corresponding points, and the processing can be speeded up.

Further, the virtual plane is desirable to be perpendicular to the road surface. Also, it is desirable to determine the presence of the detection object mobile when the number of points whose shift amounts are the same in the partial area of the virtual plane image is equal to or more than the predetermined threshold value. With this, knowledge about the size of the detection object mobile can be used for processing related to the detection of the mobile, and the more stable detection becomes possible. Also, the existence range and the traveling velocity can be extracted simultaneously.

Furthermore, it is desirable to set the partial area to be a segment area which extends along the traveling direction of the image of the detection object mobile so as to include a part of the image of the detection object mobile. With this, processing time can be reduced.

Still further, it is desirable to detect an area in a virtual plane image, which is corresponding to an area in a plane where the detection object vehicle passes, as a mobile passing area, and determine the presence of the detection object mobile when the number of points having the same shift amount in a partial area on the virtual plane image is equal to or more than a predetermined threshold value and one or more point having the same shift amount is detected from the mobile passing area. With this, only a mobile traveling on an area in a plane where the detection object vehicle passes, that is, on a specified road, can be detected.

It is desirable that the mobile mounting the imaging device is being a vehicle, and the detection object mobile is being another vehicle traveling on a lane neighboring to a lane where the vehicle mounting the imaging device is traveling.

It is desirable to set a size of the partial area in the virtual plane image depending on the length of the detection object mobile. With this, the mobiles which are significantly different in length can be detected together.

Also, it is desirable to: by assuming that each pixel of an input image obtained by an imaging device installed on a mobile corresponds to each point on a virtual line parallel to a traveling direction of the mobile in a real world, convert the input image to an image viewed from a direction perpendicular to the virtual line for generating a virtual line image; relate the points on two virtual line images which are generated at two different times; obtain shift amounts between the corresponding points; and detect the detection object mobile based on an arrangement of the points whose shift amounts are equal.

When two mobiles are traveling in parallel, the entire length of the detection object mobile on the virtual line image does not change. Therefore, the enlargement/reduction processing is not required every, time the partial images are collated on searching the corresponding points. In particular, with the one-dimensionally-configured processing, the processing can be made to be speeded up drastically.

While the invention has been described with reference to exemplary embodiments (and examples) thereof, the invention is not limited to these embodiments (and examples). Various changes in form and details which are understood by those skilled in the art may be made within the scope of the present invention.

BRIEF DESCRIPTION OF THE DRAWINGS

FIG. 8 is a conceptual diagram showing an example of a histogram of the shift amounts, generated by integrating the shift amounts of the feature points in a vertical direction;

FIG. 9 is a conceptual diagram showing an example of an accumulated histogram, generated by accumulating the histogram in partial sections shown in FIG. 8;

Figure 1:
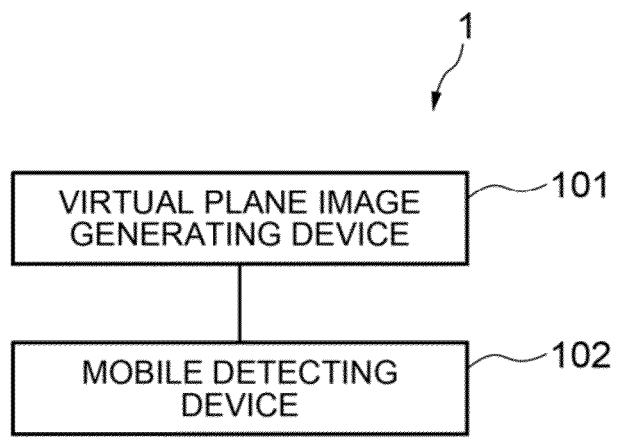
FIG. 1 is a functional block diagram showing a configuration of a mobile detector according to an exemplary embodiment to which the invention is applied in a simplified manner.
Figure 2:
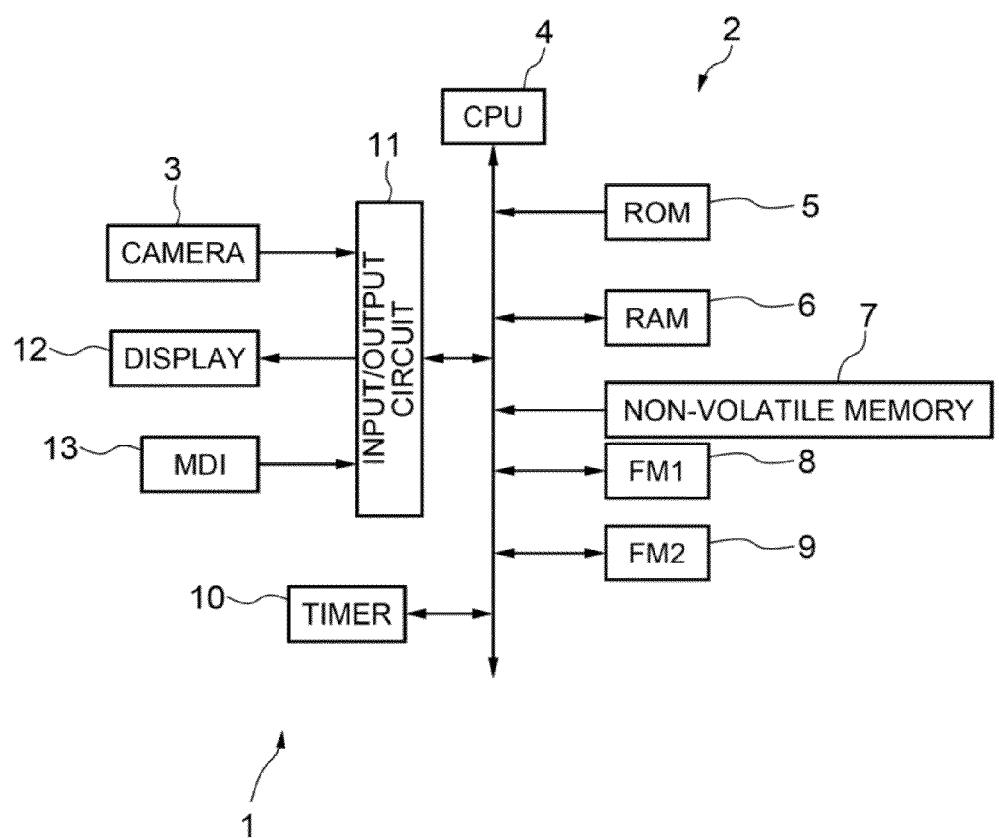
FIG. 2 is a block diagram showing a connected state of a computer configuring a main part of the mobile detector according to the exemplary embodiment and a camera functioning as an imaging device.
Figure 3:
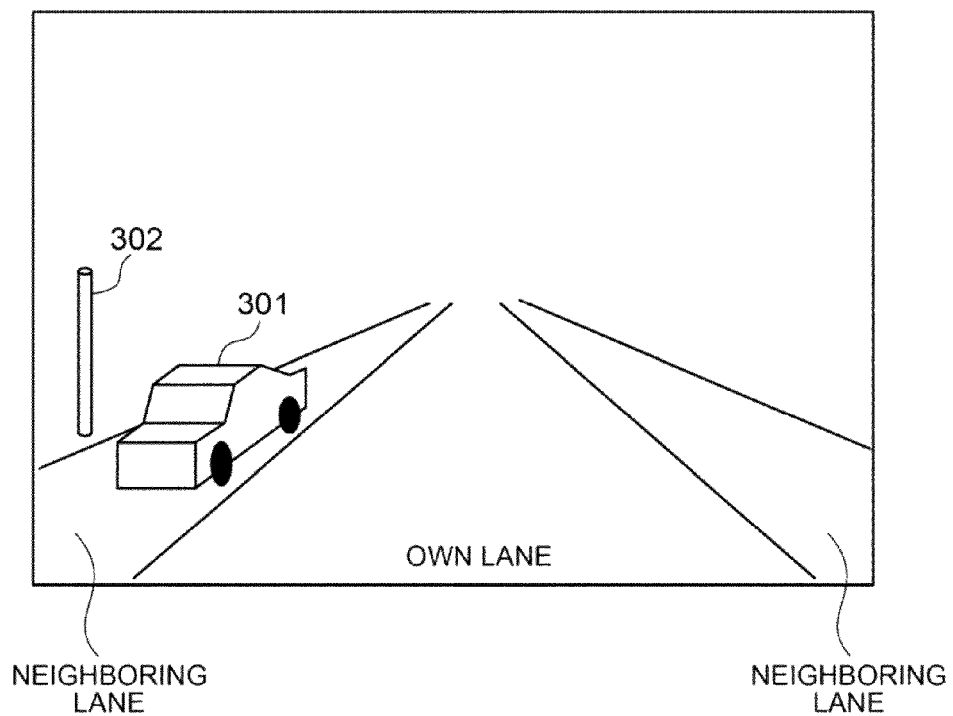
FIG. 3 is a conceptual diagram showing an example of an image captured by the camera installed at a backward-looking posture on the vehicle which is traveling on a center-lane of a three-lane roadway.
Figure 4:
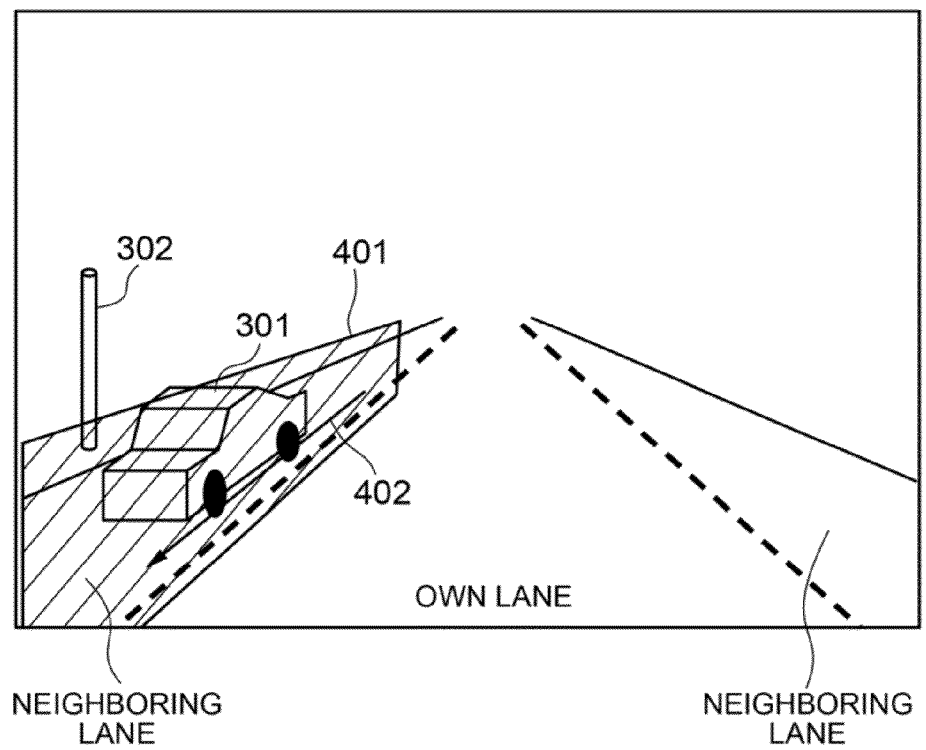
FIG. 4 is a conceptual diagram showing an example of setting a virtual plane.
Figure 5:
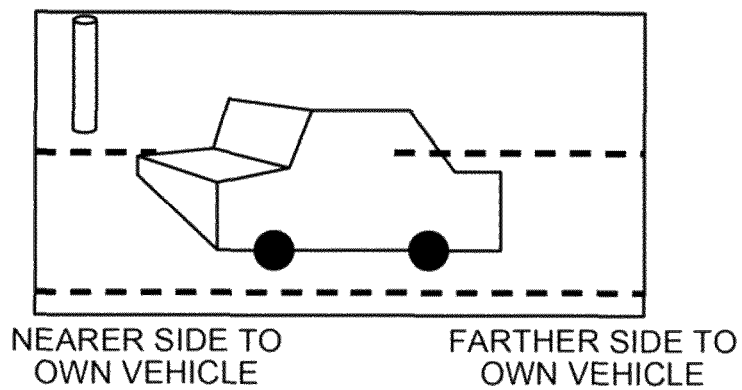
FIG. 5 is a conceptual diagram showing an example of a virtual plane image corresponding to the input image shown in FIG. 3.
Figure 6:
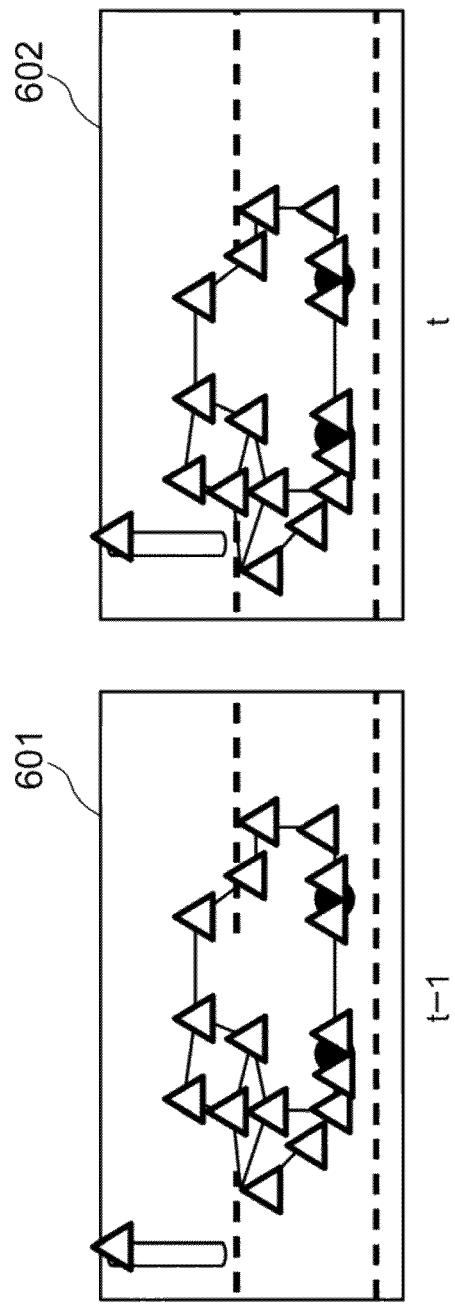
FIG. 6 is a conceptual diagram showing an example of virtual plane images generated at two different times t−1 and t.
Figure 7:
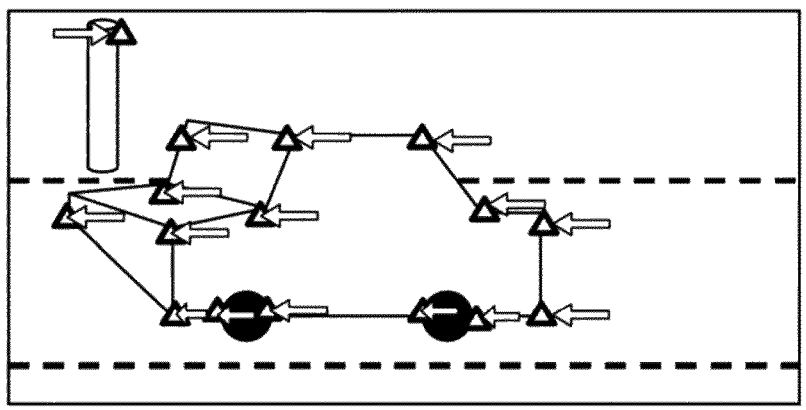
FIG. 7 is a conceptual diagram showing an example of shift amount information of the feature points.
Figure 10:
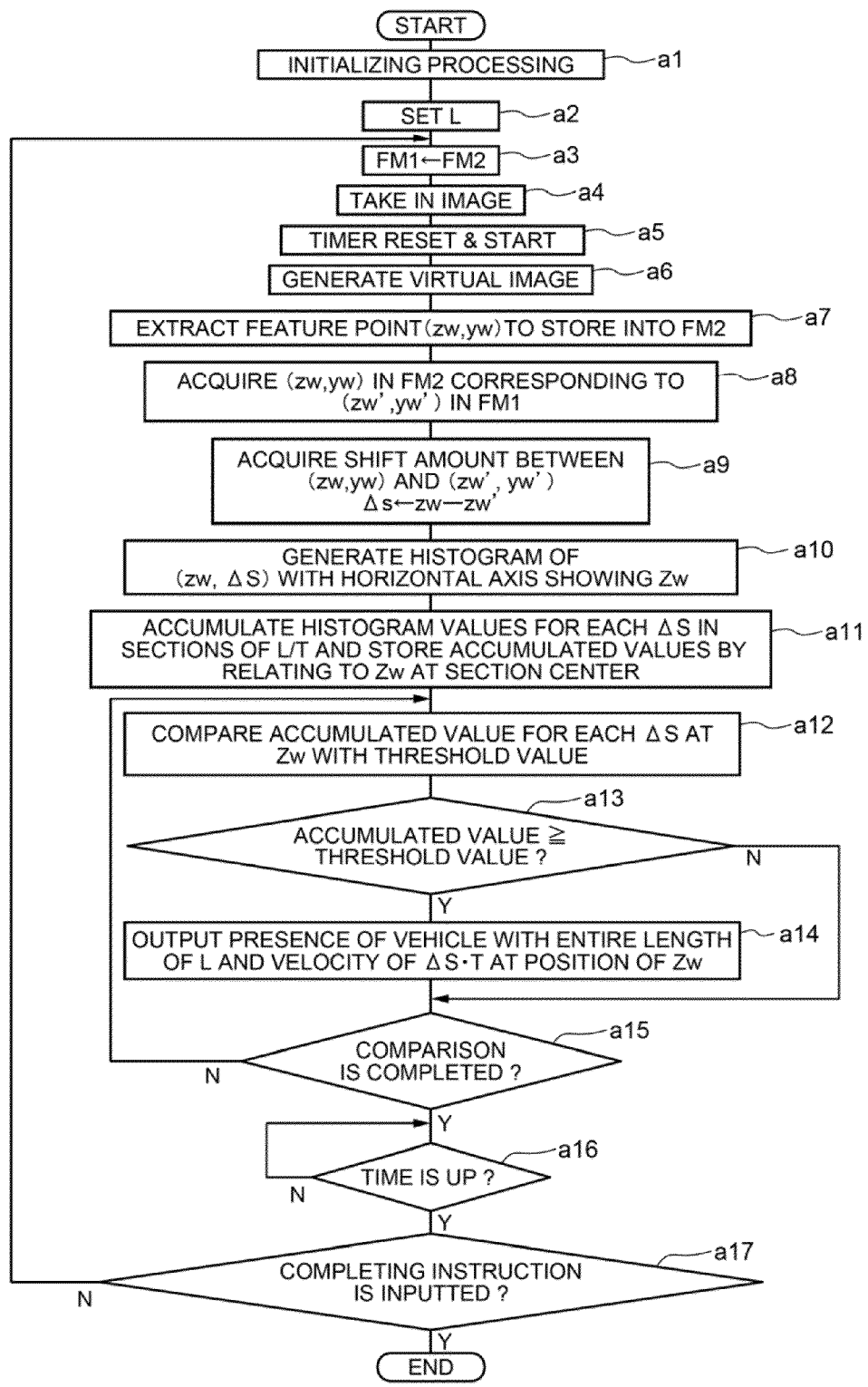
FIG. 10 is a flowchart showing a flow of processing by a mobile detecting program in a simplified manner.
Figure 11:
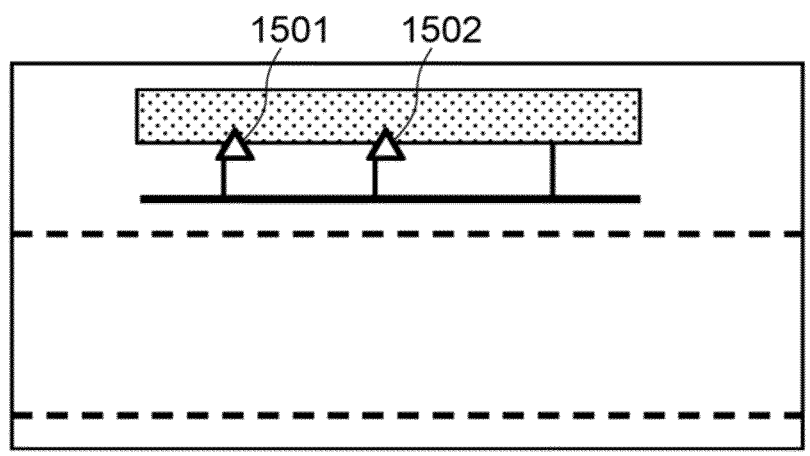
FIG. 11 is an illustration showing an example when a plurality of points are detected as similar points.
Figure 12:
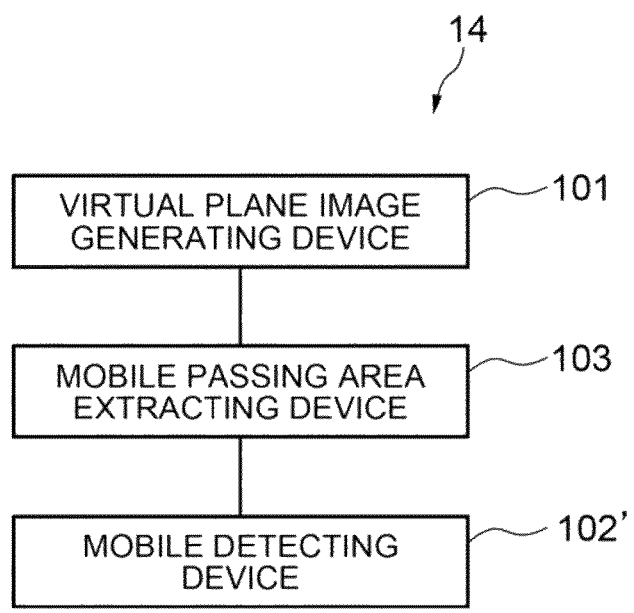
FIG. 12 is a functional block diagram showing a configuration of a mobile detector according to another exemplary embodiment to which a mobile passing area extracting device is added, in a simplified manner.
Figure 13:
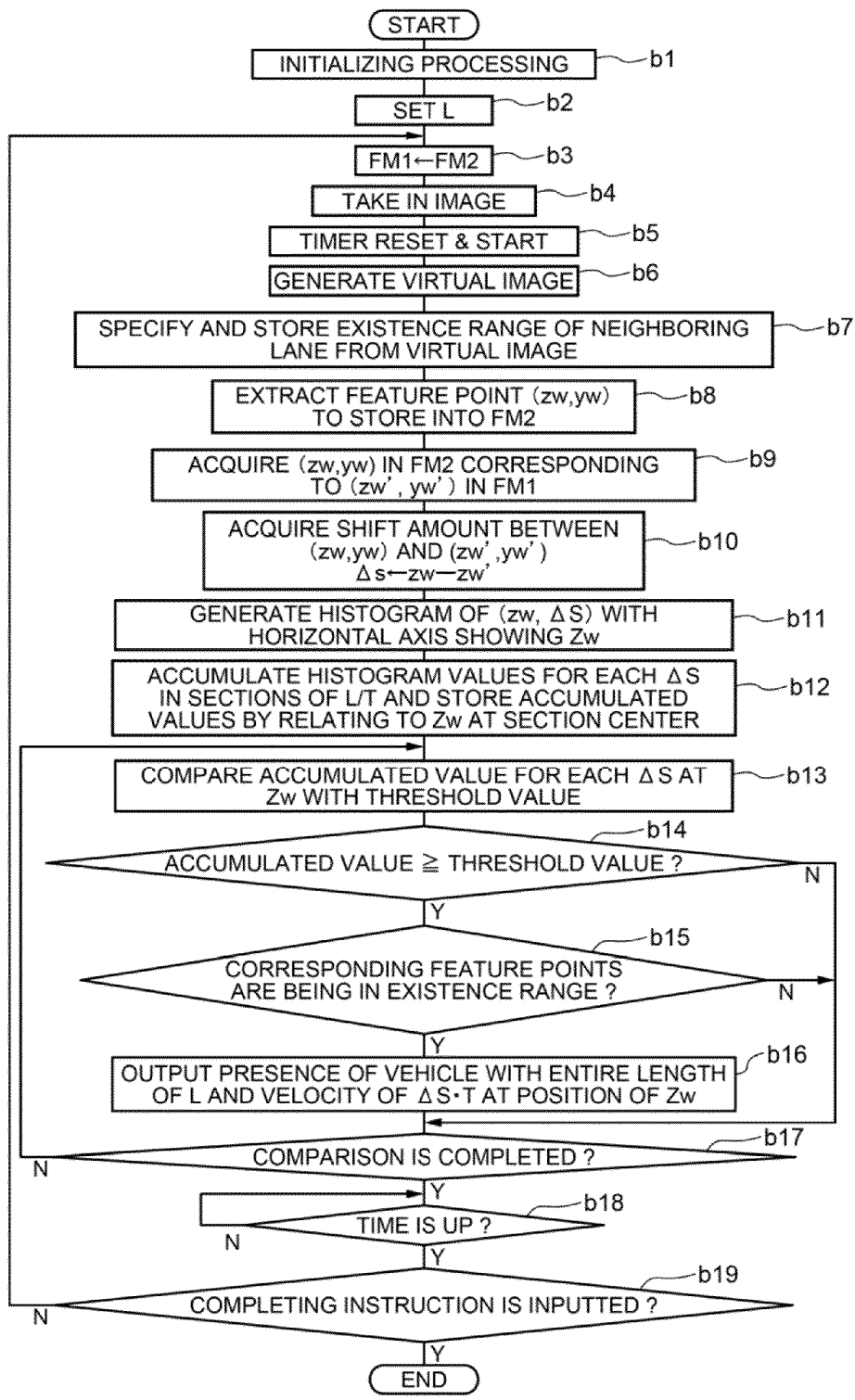
FIG. 13 is a flowchart showing a flow of processing by a mobile detection program in a simplified manner.
Figure 14:
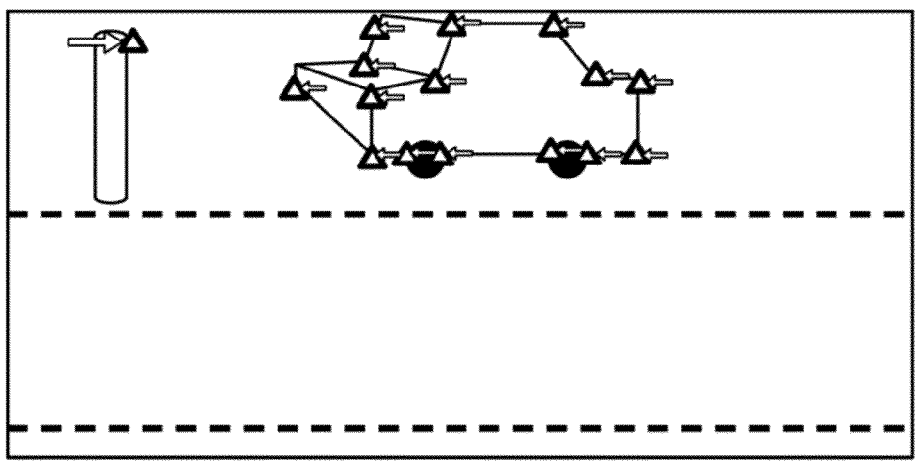
FIG. 14 is a conceptual diagram showing the shift amounts of the feature points on the virtual plane image when a mobile is traveling on a lane which is neighboring to a neighboring lane.
Figure 15:
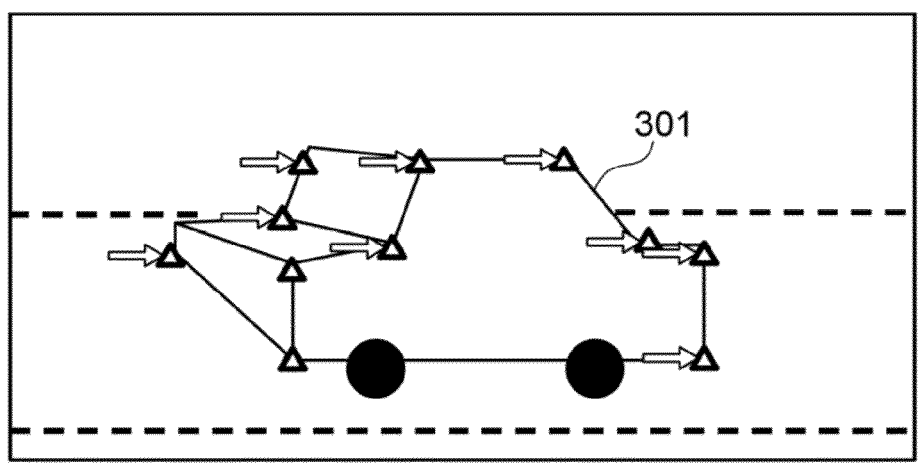
FIG. 15 is a conceptual diagram showing the shift amounts of the feature points on the virtual plane image when a mobile is traveling on the neighboring lane.
Figure 16:
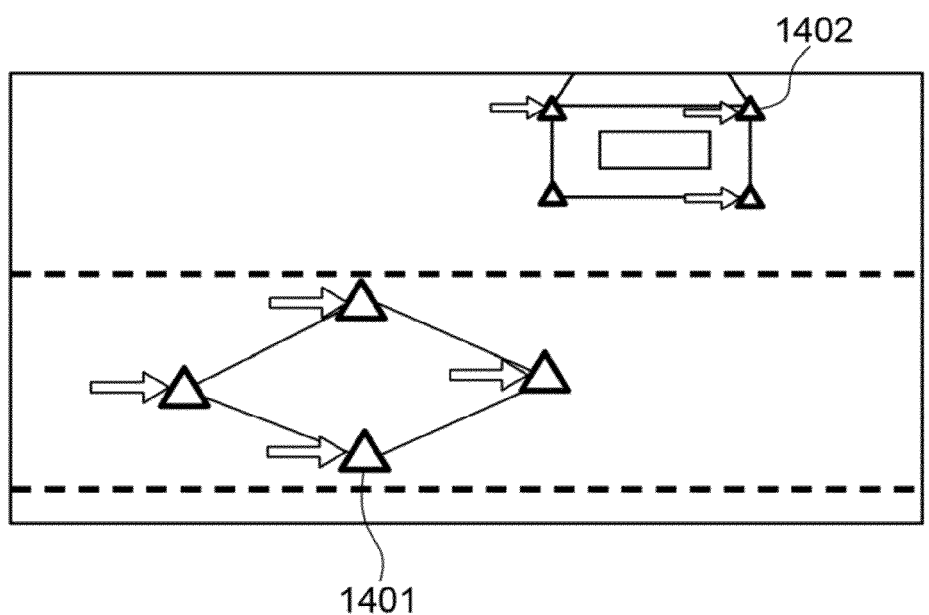
FIG. 16 is a conceptual diagram showing the shift amounts of the feature points with respect to a background and a road surface pattern.
Figure 17:
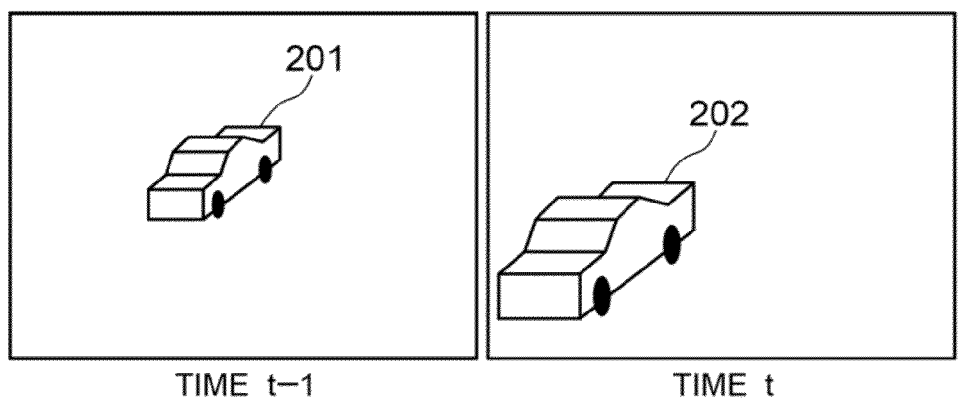
FIG. 17 is a conceptual diagram showing an example of input images at two different times t−1 and t with a vehicle being approaching.

| REFERENCE NUMERALS | |
|---|---|
| 1 | Mobile detector |
| 2 | Computer |
| 3 | Camera (Imaging device) |

-continued

REFERENCE NUMERALS

| | |
|---|---|
| 4 | CPU |
| 5 | ROM |
| 6 | RAM |
| 7 | Non-volatile memory |
| 8, 9 | Frame memory |
| 10 | Timer |
| 11 | Input/output circuit |
| 12 | Display |
| 13 | Manual data input device |
| 14 | Mobile detector |
| 101 | Virtual plane image generating device |
| 102 | Mobile detecting device |
| 102' | Mobile detecting device |
| 103 | Mobile passing area extracting device |
| 201 | Detection object vehicle at a time t − 1 |
| 202 | Detection object vehicle at a time t |
| 301 | Vehicle (Detection object mobile) |
| 302 | Electric pole existing in the background |
| 401 | Virtual plane |
| 402 | Traveling path |
| 601 | Virtual plane image at a time t − 1 |
| 602 | Virtual plane image at a time t |
| 1401 | Feature points corresponding to road marking paint |
| 1402 | Feature points corresponding to house in the background |

What is claimed is:

1. A mobile detector, comprising:
a virtual plane image generating device which generates, on an assumption that each pixel of an input image obtained by an imaging device on a mobile corresponds to each point on a virtual plane on a real world parallel to a traveling direction of the mobile, a virtual plane image by converting the input image to an image viewed from a direction perpendicular to the virtual plane; and
a mobile detecting device which relates each of points on two virtual plane images which are generated at two different times, obtains a shift amount between corresponding points, and detects a detection object mobile based on an arrangement of the points having the same shift amount,
wherein the mobile detecting device determines a presence of the detection object mobile when the number of points having the same shift amount in a partial area of the virtual plane image is equal to or more than a predetermined threshold value.

2. The mobile detector as claimed in claim 1, wherein the virtual plane is perpendicular to a road surface.

3. The mobile detector as claimed in claim 1, wherein the partial area is being a segment area which is set along the traveling direction of the image of the detection object mobile so as to include a part of the image of the detection object mobile.

4. The mobile detector as claimed in claim 1, further comprising a mobile passing area extracting device which detects an area in a virtual plane image, which is corresponding to an area in a plane where the detection object mobile passes, as a mobile passing area, wherein
the mobile detecting device determines the presence of the detection object mobile when the number of points having the same shift amount in a partial area on the virtual plane image is equal to or more than a predetermined threshold value and one or more point having the same shift amount is detected from the mobile passing area.

5. The mobile detector as claimed in claim 1, wherein the mobile mounting the imaging device is being a vehicle, and the detection object mobile is being another vehicle traveling on a lane neighboring to a lane where the vehicle mounting the imaging device is traveling.

6. The mobile detector as claimed in claim 1, wherein a size of the partial area in the virtual plane image is settable according to the length of the detection object mobile.

7. A non-transitory computer readable recording medium storing a mobile detecting program causing a computer connected to an imaging device installed on a mobile to execute:
a virtual plane image generating function for generating, on an assumption that each pixel of an input image obtained by an imaging device corresponds to each point on a virtual plane on a real world parallel to a traveling direction of the mobile, a virtual plane image by converting the input image to an image viewed from a direction perpendicular to the virtual plane; and
a mobile detecting function for relating each of points on two virtual plane images which are generated at two different times, obtaining a shift amount between corresponding points, and detecting the detection object mobile based on an arrangement of the points having the same shift amount,
wherein the presence of the detection object mobile is determined by the mobile detecting function, when the number of points having the same shift amount in a partial area of the virtual plane image is equal to or more than a predetermined threshold value.

8. The non-transitory computer readable recording medium storing the mobile detecting program as claimed in claim 7, wherein
the input image is converted, by the virtual plane image generating function, to an image viewed from a perpendicular direction to the virtual plane on the real world which is perpendicular to a road surface.

9. The non-transitory computer readable recording medium storing the mobile detecting program as claimed in claim 7, wherein
the partial area is set to be a segment area which extends along the traveling direction of the image of the detection object mobile so as to include a part of the image of the detection object mobile, by the mobile detecting function.

10. The non-transitory computer readable recording medium storing the mobile detecting program as claimed in claim 7, causing a computer to execute an area setting function for setting a size of the partial area in the virtual plane image according to the length of the detection object mobile.

11. A mobile detecting method, comprising:
taking in an image at every predetermined cycle by an imaging device installed on a mobile;
generating, on an assumption that each pixel of an input image obtained by an imaging device on a mobile corresponds to each point on a virtual plane on a real world parallel to a traveling direction of the mobile, a virtual plane image by converting the input image to an image viewed from a direction perpendicular to the virtual plane;
relating the points on the virtual plane image generated immediately before to the points on the virtual plane image generated currently to obtain a shift amount between corresponding points;
detecting the detection object mobile based on an arrangement of the points having the same shift amount;
determining the presence of the detection object mobile when the number of points having the same shift amount in a partial area on the virtual plane image is equal to or more than a predetermined threshold value.

12. The mobile detecting method as claimed in claim 11, comprising:
    converting the input image to an image viewed from a direction perpendicular to the virtual plane on the real world, which is perpendicular to a road surface, when generating the virtual plane image.

13. The mobile detecting method as claimed in claim 11, comprising:
    setting the partial area as a segment area which extends along the traveling direction of the image of the detection object mobile so as to include a part of the image of the detection object mobile.

14. The mobile detecting method as claimed in claim 11, comprising:
    setting a size of the partial area in the virtual plane image according to the length of the detection object mobile.

15. A mobile detector, comprising:
    virtual plane image generating means for generating, on an assumption that each pixel of an input image obtained by an imaging device on a mobile corresponds to each point on a virtual plane on a real world parallel to a traveling direction of the mobile, a virtual plane image by converting the input image to an image viewed from a direction perpendicular to the virtual plane; and mobile detecting means for relating each of points on two virtual plane images which are generated at two different times, obtaining a shift amount between corresponding points, and detecting a detection object mobile based on an arrangement of the points having the same shift amount, wherein the mobile detecting means determines a presence of the detection object mobile when the number of points having the same shift amount in a partial area of the virtual plane image is equal to or more than a predetermined threshold value.

* * * * *